(12) United States Patent
Austin et al.

(10) Patent No.: US 11,022,357 B2
(45) Date of Patent: Jun. 1, 2021

(54) SYSTEM AND METHOD OF OPERATING A VARIABLE SPEED COMPRESSOR WITH A TWO-STAGE CONTROLLER

(71) Applicant: Carrier Corporation, Palm Beach Gardens, FL (US)

(72) Inventors: Matthew Austin, Indianapolis, IN (US); Derek Leman, Brownsburg, IN (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 747 days.

(21) Appl. No.: 15/286,427

(22) Filed: Oct. 5, 2016

(65) Prior Publication Data

US 2017/0097183 A1 Apr. 6, 2017

Related U.S. Application Data

(60) Provisional application No. 62/237,313, filed on Oct. 5, 2015.

(51) Int. Cl.
*F25B 49/02* (2006.01)

(52) U.S. Cl.
CPC .... *F25B 49/022* (2013.01); *F25B 2600/0253* (2013.01); *F25B 2700/2104* (2013.01); *F25B 2700/2106* (2013.01); *Y02B 30/70* (2013.01)

(58) Field of Classification Search
CPC ............ F25B 49/022; F25B 2700/2106; F25B 2600/0253; F25B 2700/2104
See application file for complete search history.

(56) References Cited

U.S. PATENT DOCUMENTS

| 5,568,732 | A | * | 10/1996 | Isshiki | F25B 13/00 62/129 |
|---|---|---|---|---|---|
| 2003/0056946 | A1 | * | 3/2003 | Breeden | G05D 23/1917 165/238 |
| 2005/0155369 | A1 | * | 7/2005 | Ootori | F25B 49/025 62/228.1 |

(Continued)

FOREIGN PATENT DOCUMENTS

JP         2003254584 A  *  9/2003

OTHER PUBLICATIONS

Lee et al., Heating Operation Control Method of Air Conditioner, Sep. 10, 2003, JP2003254584, Whole Document.*

*Primary Examiner* — Larry L Furdge
(74) *Attorney, Agent, or Firm* — Cantor Colburn LLP (57) ABSTRACT

A system and method of operating an HVAC system including a HVAC unit including a unit temperature sensor, a unit controller, and a variable speed compressor, and a two-stage system controller in communication with the unit controller, the method including operating the system controller to transmit a conditioning signal to the unit controller based in part on a system demand, operating the unit controller to receive the conditioning signal, and receive outdoor air temperature data from the unit temperature sensor, operating the unit controller to determine whether the outdoor air temperature data is greater than or equal to a cooling temperature limit or less than or equal to a heating temperature limit, and operating the unit controller to transmit a speed signal to the compressor based in part on the plurality of conditioning signals and the outdoor air temperature data.

18 Claims, 4 Drawing Sheets

(56) References Cited

U.S. PATENT DOCUMENTS

| | | | |
|---|---|---|---|
| 2006/0032252 A1* | 2/2006 | Lee | F25B 49/022 |
| | | | 62/175 |
| 2009/0127932 A1* | 5/2009 | Warren | H02J 9/06 |
| | | | 307/64 |
| 2013/0186111 A1* | 7/2013 | Kim | F25B 49/022 |
| | | | 62/56 |
| 2013/0226352 A1* | 8/2013 | Dean-Hendricks | F24F 11/30 |
| | | | 700/276 |

* cited by examiner

| MODE | OAT | T-STAT CONDITIONING SIGNAL | UNIT CONTROL SPEED SIGNAL | COMPRESSOR SPEED (RPM) | |
|---|---|---|---|---|---|
| COOLING | ≥ 85° F | FIRST COOLING CONDITIONING | FIRST COOLING SPEED | 4500 | ~ 302 |
| | ≥ 85° F | SECOND COOLING CONDITIONING | SECOND COOLING SPEED | 2500 | ~ 304 |
| | < 85° F | FIRST COOLING CONDITIONING | FIRST COOLING SPEED | 4500 | ~ 306 |
| | < 85° F | SECOND COOLING CONDITIONING | THIRD COOLING SPEED | 1100 | ~ 308 |
| HEATING | ≤ 40° F | FIRST HEATING CONDITIONING | FIRST HEATING SPEED | 5400 | ~ 310 |
| | ≤ 40° F | SECOND HEATING CONDITIONING | SECOND HEATING SPEED | 3600 | ~ 312 |
| | > 40° F | FIRST HEATING CONDITIONING | FIRST HEATING SPEED | 5400 | ~ 314 |
| | > 40° F | SECOND HEATING CONDITIONING | THIRD HEATING SPEED | 1800 | ~ 316 |

FIG. 4

SYSTEM AND METHOD OF OPERATING A VARIABLE SPEED COMPRESSOR WITH A TWO-STAGE CONTROLLER

CROSS-REFERENCE TO RELATED APPLICATIONS

The present application is a nonprovisional patent application, which claims priority to 62/237,313, filed Oct. 5, 2015, which is herein incorporated in its entirety.

TECHNICAL FIELD OF THE DISCLOSED EMBODIMENTS

The presently disclosed embodiments generally relate to heating, ventilation, and air conditioning (HVAC) systems, and more particularly, to a system and method of operating a variable speed compressor with a two-stage controller.

BACKGROUND OF THE DISCLOSED EMBODIMENTS

An increasing number of HVAC units are using variable speed compressor technology to improve efficiency, comfort, and reliability. Variable speed systems typically work by connecting a motor control drive to the compressor and then connecting the line input power from the utility to the drive. The drive uses frequency modulation to adjust power output and RPM of the compressor motor, enabling it to speed up or slow down according to the heating or cooling load in the home. This ability to modulate compressor capacity enables many of the advantages of variable speed technology including improved efficiency and comfort. Other methods to control the power output and RPM of the compressor may also be employed.

Typically, using variable speed compressor technology requires a system control capable of communicating additional information beyond a mere on/off signal to the compressor or motor control drive. Typically, the communicating capability is a part of a proprietary protocol; thus, increasing the number of components of the system and increasing costs. There is therefore a need for a system and method to control a variable speed compressor at minimal costs.

SUMMARY OF THE DISCLOSED EMBODIMENTS

In one aspect, an HVAC system is provided. The HVAC system includes a two-stage system controller configured to determine a system demand and transmit a conditioning signal based in part on the system demand. In an embodiment, the two-stage system controller includes a thermostat. In an embodiment, the two-stage system controller is in at least one of a wireless and wired electrical communication with the HVAC unit.

In an embodiment, the two-stage system controller is further configured to transmit at least one of a first cooling conditioning signal, a second cooling conditioning signal, a first heating conditioning signal, and a second heating conditioning signal. In an embodiment, the two-stage system controller is further configured to allow adjustment of a cooling temperature limit and a heating temperature limit.

The HVAC system further includes an HVAC unit in electrical communication with the two-stage system controller. The HVAC unit includes a compressor configured to operate at a plurality of speeds, a temperature sensor configured to measure outdoor air temperature data, and a unit controller in communication with the compressor and the temperature sensor. The unit controller is configured to receive the conditioning signal, determine whether outdoor air temperature data is greater than or equal to a cooling temperature limit or less than or equal to a heating temperature limit, and transmit a speed signal to the compressor based in part on the conditioning signal and the outdoor air temperature data.

In an embodiment, the unit controller is further configured to transmit at least three speed signals to the compressor based in part on the conditioning signal and the outdoor air temperature data. In an embodiment, the unit controller is further configured to receive the at least one of the first cooling conditioning signal, the second cooling conditioning signal, the first heating conditioning signal, and the second heating conditioning signal, transmit a first cooling speed signal if the first cooling conditioning signal is received, transmit a second cooling speed signal if the second cooling conditioning signal is received and the outdoor air temperature value is greater than or equal to the cooling temperature limit, transmit a third cooling speed signal if the second cooling conditioning signal is received and the outdoor air temperature value is less than the cooling temperature limit, transmit a first heating speed signal if the first heating conditioning signal is received, transmit a second heating speed signal if the second heating conditioning signal is received and the outdoor air temperature value is less than or equal to the heating temperature limit, and transmit a third heating speed signal if the second heating signal conditioning is received and the outdoor air temperature value is greater than the heating temperature limit.

In one aspect, a method for operating an HVAC system is provided. The method includes operating a two-stage system controller to transmit a conditioning signal to the unit controller based in part on a system demand, operating an HVAC unit controller to receive the conditioning signal, and receive outdoor air temperature data from a unit temperature sensor, operating the unit controller to determine whether the outdoor air temperature data is greater than or equal to a cooling temperature limit or less than or equal to a heating temperature limit, and operating the unit controller to transmit a speed signal to the compressor based in part on the conditioning signal and the outdoor air temperature data. In an embodiment, cooling temperature limit and the heating temperature limit are adjustable. In an embodiment, cooling temperature limit is approximately 85 degrees Fahrenheit. In an embodiment, the heating temperature limit is approximately 40 degrees Fahrenheit.

In an embodiment, the method further includes operating the two-speed system controller to transmit at least one of a first cooling conditioning signal, a second cooling conditioning signal, a first heating conditioning signal, and a second heating conditioning signal. In an embodiment, the method further includes operating the unit controller to transmit at least three speed signals to the compressor based in part on the conditioning signal and the outdoor air temperature data.

In an embodiment, operating the unit controller to transmit a speed signal to the compressor based in part on the conditioning signal and the outdoor air temperature data includes operating the unit controller to transmit: a first cooling speed signal if the first cooling conditioning signal is received, a second cooling speed signal if the second cooling conditioning signal is received and the outdoor air temperature value is greater than or equal to the cooling temperature limit, a third cooling speed signal if the second cooling conditioning signal is received and the outdoor air temperature value is less than the cooling temperature limit, a first heating speed signal if the first heating conditioning signal is received, a second heating speed signal if the second heating conditioning signal is received and the outdoor air temperature value is less than or equal to the heating temperature limit, and a third heating speed signal if the second heating conditioning signal is received and the outdoor air temperature value is greater than the heating temperature limit.

In an embodiment, the first cooling speed signal is indicative of a compressor operational speed of approximately 4500 revolutions per minute, the second cooling speed signal is indicative of a compressor operational speed of approximately 2500 revolutions per minute, and the third cooling speed signal is indicative of a compressor operational speed of approximately 1100 revolutions per minute, the first heating speed signal is indicative of a compressor operational speed of approximately 5400 revolutions per minute, the second heating speed signal is indicative of a compressor operational speed of approximately 3600 revolutions per minute, and the third heating speed signal is indicative of a compressor operational speed of approximately 1800 revolutions per minute.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
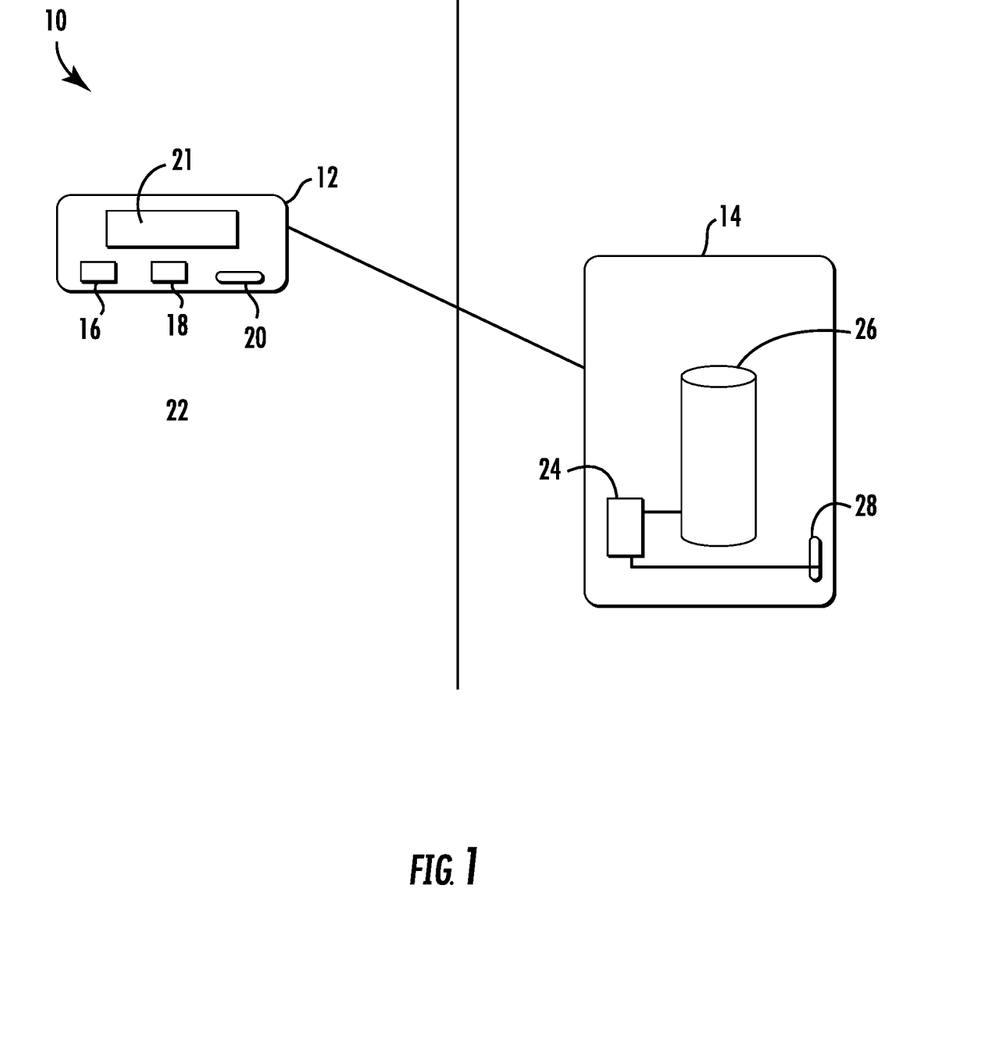
FIG. 1 illustrates a schematic diagram of a HVAC system according to an embodiment of the present disclosure.

FIG. 1 schematically illustrates an embodiment of an HVAC system, generally indicated at 10, configured to condition air within an interior space. The HVAC system 10 includes a two-stage system controller 12 in communication with an HVAC unit 14. In an embodiment, the two-stage system controller 12 includes a thermostat.

The two-stage system controller 12 includes a processor 16 in communication with a memory 18 for example read only memory (ROM) and electrically erasable programmable read only memory (EEPROM) to name two non-limiting examples. The processor is in further communication with a controller temperature sensor 20 and a display 21, for example a liquid crystal display (LCD) to name one non-limiting example. The processor 16 and memory 18 are configured to operate the HVAC unit 14 in accordance with the method 100 as later described herein. The controller temperature sensor is configured to measure the air temperature within an interior space 22 of a building (not shown).

The two-stage system controller 12 is configured to transmit a conditioning signal based in part on the system demand in response to a condition to heat or cool the interior space 22. In an embodiment, the two-stage system controller 12 is in wireless electrical communication with the HVAC unit 14. In another embodiment, the two-stage system controller 12 is in wired electrical communication with the HVAC unit 14.

The HVAC unit 14 includes a unit controller 24 in electrical communication with a variable speed compressor 26 and a unit temperature sensor 28. The unit controller 24 is configured to receive data from the unit temperature sensor 28, receive the conditioning signal from the two-stage system controller 12, and transmit a speed signal to the variable speed compressor 26 based in part on the conditioning signal and data from the unit temperature sensor 28.

The variable speed compressor 26 is configured to operate at a plurality of speeds in a heating or cooling mode to deliver a compressed refrigerant. The unit temperature sensor 28 is configured to measure an ambient air temperature around the HVAC unit 14. It will be appreciated that the HVAC unit 14 may be a split system, variable refrigerant flow ductless unit, heat pump, a packaged unit, or a geothermal heat pump, to name a few non-limiting examples. It will be further appreciated that the unit temperature sensor 28 may be internal or external to the HVAC unit 14.

Figure 2:
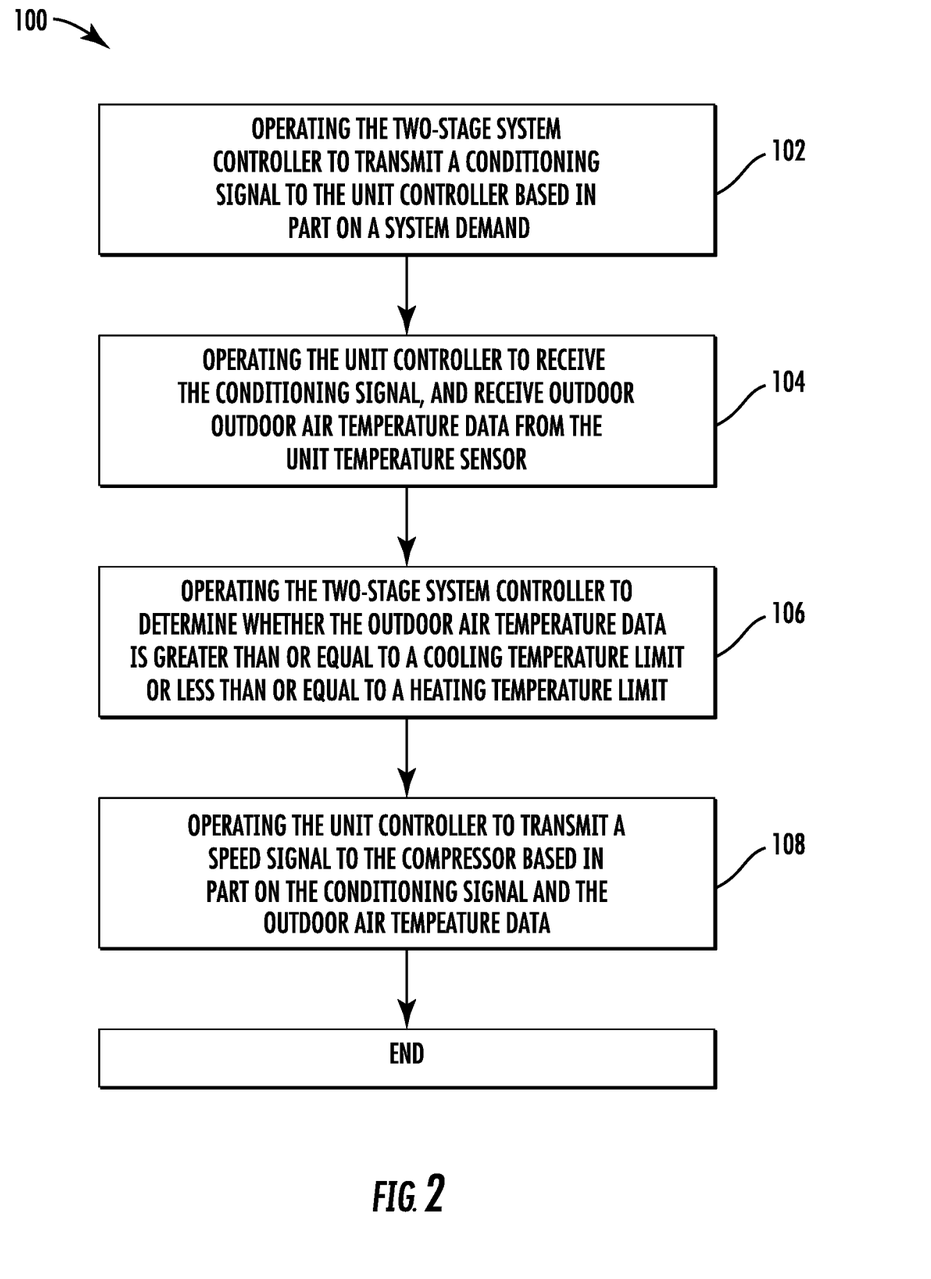
FIG. 2 illustrates a schematic flow diagram of a method of controlling a variable speed HVAC unit with a two-stage thermostat according to one embodiment of the present disclosure.

FIG. 2 illustrates an embodiment of a method operating the HVAC system 10, the method generally indicated at 100. The method 100 includes step 102 of operating the two-stage system controller 12 to transmit a conditioning signal to the unit controller 24 based in part on a system demand. In an embodiment, step 102 further includes operating the two-speed system controller 12 to transmit at least one of a first cooling conditioning signal, a second cooling conditioning signal, a first heating conditioning signal, and a second heating conditioning signal.

For example, if the room air temperature of the interior space 22, as measured by the controller temperature sensor 20, is greater than a controller set point temperature, the two-stage system controller 12 transmits at least one cooling signal to the unit controller 24 to operate the HVAC unit 14 in a cooling mode. Depending on the difference between the room air temperature and the controller set point temperature (i.e. the system demand), or the amount of time the HVAC unit 14 operates in the cooling mode, the system controller 12 may send either the first cooling signal (typically Y2) to operate at a higher cooling capacity or a second cooling signal (typically Y or Y1) to operate at a lower cooling capacity.

If the room air temperature of the interior space 22, as measured by the controller temperature sensor 20, is less than a controller set point temperature, the two-stage system controller 12 transmits at least one heating signal to the unit controller 24 to operate the HVAC unit 14 in a heating mode. Depending on the difference between the room air temperature and the controller set point temperature (i.e. the system demand), or the amount of time the HVAC unit 14 operates in the heating mode, the two-stage system controller 12 may send either the first heating signal (typically W2) to operate at a higher heating capacity or a second heating signal (typically W or W1) to operate at a lower heating capacity.

The method 100 further includes step 104 of operating the unit controller 24 to receive the conditioning signal, and receive an outdoor air temperature data from the unit temperature sensor 28. For example, after the two-stage system controller 12 transmits either the cooling signal or the heating signal, the unit controller 24 receives the signal, and then receives outdoor air temperature data from the unit temperature sensor 28. The outdoor air temperature data is then transmitted to the two-stage system controller 12.

The method 100 further includes step 106 of operating the unit controller 24 to determine whether the outdoor air temperature data is greater than or equal to a cooling temperature limit or less than or equal to a heating temperature limit. In an embodiment, the cooling temperature limit is approximately 85 degrees Fahrenheit (approximately 29.4 degrees Celsius). In an embodiment, the heating temperature limit is approximately 40 degrees Fahrenheit (approximately 4.4 degrees Celsius). In one embodiment, the cooling temperature limit and the heating temperature limit are adjustable, and may be greater than or less than 85 degrees Fahrenheit or 40 degrees Fahrenheit, respectively. As such, the cooling temperature limit and the heating temperature limit may be any outdoor air temperature suitable to accomplish the method 100.

Figure 3:
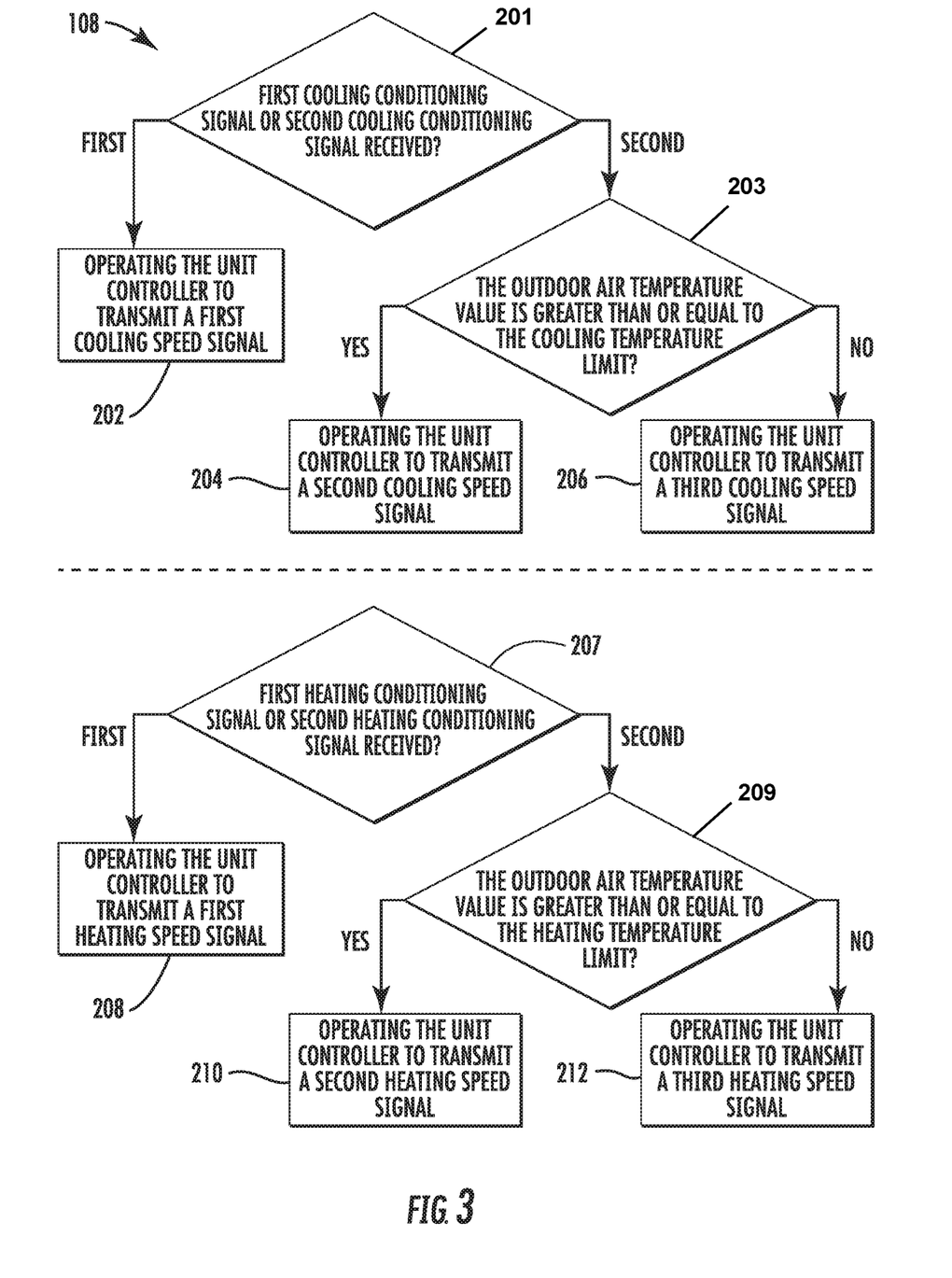
FIG. 3 illustrates a schematic flow diagram of a method of controlling a variable speed HVAC unit with a two-stage thermostat according to one embodiment of the present disclosure.

The method 100 further includes step 108 of operating the unit controller 24 to transmit a speed signal to the compressor 26 based in part on the conditioning signal and the outdoor temperature data from the unit temperature sensor 28. In an embodiment, as shown in FIG. 3, step 108 further includes step 201 of determining whether a first cooling conditioning signal or a second cooling conditioning signal is received. If the first cooling conditioning signal is received, the method proceeds to step 202 of operating the unit controller 24 to transmit a first cooling speed signal to the compressor 26. In an embodiment, the first cooling speed signal is indicative of a compressor 26 operational speed of approximately 4500 revolutions per minute.

For example, as shown in the table in FIG. 4, rows 302 and 306 illustrate that when the unit controller 24 receives a first cooling conditioning signal from the two-stage system controller 12, the unit controller 24 subsequently sends a first cooling speed signal to operate the compressor 26 at approximately 4500 revolutions per minute regardless of the outdoor air temperature. Typically, the first cooling conditioning signal represents a request for maximum cooling from the HVAC system 10. As a result, regardless of the data from the unit temperature sensor 28, the compressor 26 will be operated at maximum power and RPM.

Returning to FIG. 3, if the second cooling conditioning signal in step 201 is received, the method proceeds to step 203 of determining whether the outdoor air temperature data is greater than or equal to the cooling temperature limit. If the outdoor air temperature data is greater than or equal to the cooling temperature limit, the method proceeds to step 204 of operating the unit controller 24 to transmit a second cooling speed signal to the compressor 26. In an embodiment, the second cooling speed signal is indicative of a compressor 26 operational speed of approximately 2500 revolutions per minute. It will be appreciated that the second cooling speed signal may be indicative of any compressor operational speed less than the compressor operational speed of the first cooling speed signal. Typically, the second cooling conditioning signal represents a request for cooling from the HVAC system 10 less than the maximum required to meet the demand of the system 10.

Figure 4:
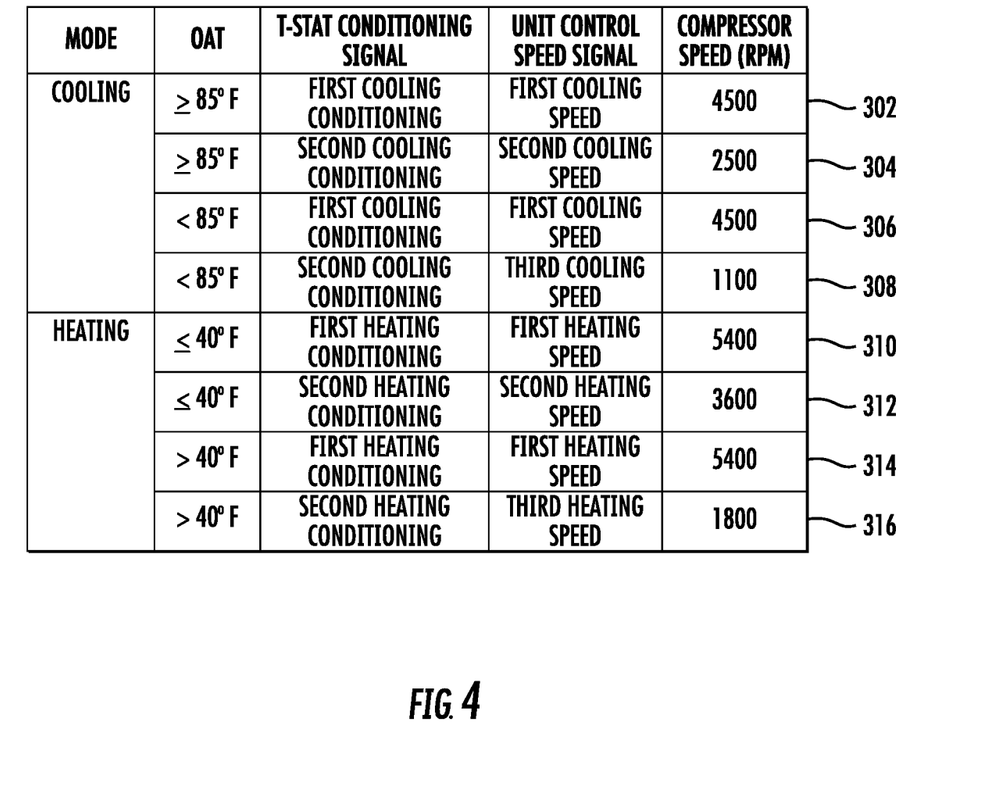
FIG. 4 illustrates a chart of controlling a variable speed HVAC unit with a two-stage thermostat according to one embodiment of the present disclosure.

For example, as shown in FIG. 4, row 304 illustrates that when the unit controller 24 receives a second cooling conditioning signal from the two-stage system controller 12, and the measured outdoor air temperature is greater than or equal to approximately 85 degrees Fahrenheit (approximately 29.4 degrees Celsius), the unit controller 24 subsequently sends a second cooling speed signal to operate the compressor 26 at approximately 2500 revolutions per minute.

Returning to FIG. 3, if the outdoor air temperature data is less than the cooling temperature limit, the method proceeds to step 206 of operating the unit controller 24 to transmit a third cooling speed signal to the compressor 26. In an embodiment, the third cooling speed signal is indicative of a compressor 26 operational speed of approximately 1100 revolutions per minute. It will be appreciated that the third cooling speed signal may be indicative of any compressor operational speed less than the compressor operational speed of the first cooling speed signal and the second cooling speed signal. Typically, the third cooling conditioning signal represents a request for cooling from the HVAC system 10 less than the maximum required to meet the demand of the system 10. Moreover, as the outdoor air temperature data is less than the cooling temperature limit, there is less demand on the HVAC system 10 compared to when the outdoor air temperature data is greater than or equal to the cooling temperature limit.

For example, as shown in FIG. 4, row 308 illustrates that when the unit controller 24 receives a second cooling conditioning signal from the two-stage system controller 12, and the measured outdoor air temperature is less than approximately 85 degrees Fahrenheit (approximately 29.4 degrees Celsius), the unit controller 24 subsequently sends a third cooling speed signal to operate the compressor 26 at approximately 1100 revolutions per minute.

It will be appreciated that the unit controller 24 may transmit more than three cooling speed signals to the compressor 26 based in part on the measured outdoor air temperature, the system demand, and/or the amount of time the HVAC unit operates in a cooling mode. In one embodiment, greater than three cooling speed signals are based upon establishing multiple temperature limits, each corresponding to various cooling speeds. For example, the unit controller 24 may transmit a fourth cooling conditioning signal to the compressor 26 if the outdoor air temperature data is greater than or equal to the first cooling temperature limit (e.g. 85° F.) and less than a second cooling temperature limit (e.g. 90° F.), and a fifth cooling conditioning signal if the outdoor air temperature data is greater than or equal to a second cooling temperature limit (e.g. 90° F.).

Returning to FIG. 3, step 108 further includes step 207 of determining whether a first heating conditioning signal or a second heating conditioning signal is received by the unit controller 24. If the first heating conditioning signal is received, the method proceeds to step 208 of operating the unit controller 24 to transmit a first heating speed signal to the compressor 26. In an embodiment, the first heating speed signal is indicative of a compressor 26 operational speed of approximately 5400 revolutions per minute. Typically, the first heating conditioning signal represents a request for maximum heating from the HVAC system 10. As a result, regardless of the data from the unit temperature sensor 28, the compressor will be operated at maximum power and RPM.

For example, as shown in the table in FIG. 4, rows 310 and 314 illustrate that when the unit controller 24 receives a first heating conditioning signal from the two-stage system controller 12, the unit controller 24 subsequently sends a first heating speed signal to operate the compressor 26 at approximately 5400 revolutions per minute regardless of the outdoor air temperature.

Returning to FIG. 3, if the second heating conditioning signal in step 207 is received, the method proceeds to step 209 of determining whether the outdoor air temperature data is less than or equal to the heating temperature limit. If the outdoor air temperature data is less than or equal to the heating temperature limit, the method proceeds to step 210 of operating the unit controller 24 to transmit a second heating speed signal to the compressor 26. In an embodiment, the second heating speed signal is indicative of a compressor 26 operational speed of approximately 3600 revolutions per minute. It will be appreciated that the second heating speed signal may be indicative of any compressor 26 operational speed less than the compressor 26 operational speed of the first heating speed signal. Typically, the second heating conditioning signal represents a request for heating from the HVAC system 10 less than the maximum required to meet the demand of the system 10.

For example, as shown in FIG. 4, row 312 illustrates that when the unit controller 24 receives a second heating conditioning signal from the two-stage system controller 12, and the measured outdoor air temperature is less than or equal to approximately 40 degrees Fahrenheit (approximately 4.4 degrees Celsius), the unit controller 24 subsequently sends a second heating speed signal to operate the compressor 26 at approximately 3600 revolutions per minute.

Returning to FIG. 3, if the outdoor air temperature data is greater than the heating temperature limit, the method proceeds to step 212 of operating the unit controller 24 to transmit a third heating speed signal to the compressor 26. In an embodiment, the third heating speed signal is indicative of a compressor 26 operational speed of approximately 1800 revolutions per minute. It will be appreciated that the third heating speed signal may be indicative of any compressor 26 operational speed less than the compressor 26 operational speed of the first heating speed signal and the second heating speed signal. Typically, the third heating conditioning signal represents a request for heating from the HVAC system 10 less than the maximum required to meet the demand of the system 10. Moreover, as the outdoor air temperature data is greater than the heating temperature limit, there is less demand on the HVAC system 10 compared to when the outdoor air temperature data is less than or equal to the heating temperature limit.

For example, as shown in FIG. 4, row 316 illustrates that when the unit controller 24 receives a second heating conditioning signal from the two-stage system controller 12, and the measured outdoor air temperature is greater than approximately 40 degrees Fahrenheit (approximately 4.4 degrees Celsius), the unit controller 24 subsequently sends a third heating speed signal to operate the compressor 26 at approximately 1800 revolutions per minute.

It will be appreciated that the unit controller 24 may transmit more than three heating speed signal based in part on the measured outdoor air temperature, system demand, and/or the amount of time the HVAC unit operates in a heating mode. In one embodiment, greater than three heating speed signals are based upon establishing multiple temperature limits, each corresponding to various cooling speeds. For example, the unit controller 24 may transmit a fourth heating conditioning signal to the compressor 26 if the outdoor air temperature data is less than or equal to the first heating temperature limit (e.g. 40° F.) and greater than a second heating temperature limit (e.g. 35° F.), and a fifth cooling conditioning signal if the outdoor air temperature data is less than or equal to the second cooling temperature limit (e.g. 35° F.).

It will therefore be appreciated that the present embodiments includes a system and method of operating an HVAC unit 14 including a variable speed compressor 26 with a two-stage system controller 12.

While the present disclosure has been illustrated and described in detail in the drawings and foregoing description, the same is to be considered as illustrative and not restrictive in character, it being understood that only certain embodiments have been shown and described and that all changes and modifications that come within the spirit of the present disclosure are desired to be protected.

What is claimed is:

1. A method for operating an HVAC system, the HVAC system including an HVAC unit including a unit temperature sensor, a unit controller, and a compressor configured to operate at multiple speeds, and a two-stage system controller in communication with the unit controller, the method comprising:
   a. operating the two-stage system controller to transmit a conditioning signal corresponding to only two cooling capacities or only two heating capacities to the unit controller based in part on a system demand;
   b. operating the unit controller to receive the conditioning signal, and receive outdoor air temperature data from the unit temperature sensor;
   c. operating the unit controller to determine whether the outdoor air temperature data is greater than or equal to a cooling temperature limit or less than or equal to a heating temperature limit; and
   d. operating the unit controller to transmit a speed signal to the compressor based in part on the conditioning signal and the outdoor air temperature data.

2. The method of claim 1, wherein the step (a) further comprises operating the two-speed system controller to transmit at least one of a first cooling conditioning signal, a second cooling conditioning signal, a first heating conditioning signal, and a second heating conditioning signal.

3. The method of claim 2, wherein step (d) further comprises operating the unit controller to transmit at least three speed signals to the compressor based in part on the conditioning signal and the outdoor air temperature data.

4. The method of claim 3, wherein step (d) further comprises:
   (i) operating the unit controller to transmit a first cooling speed signal if the first cooling conditioning signal is received;
   (ii) operating the unit controller to transmit a second cooling speed signal if the second cooling conditioning signal is received and the outdoor air temperature value is greater than or equal to the cooling temperature limit;
   (iii) operating the unit controller to transmit a third cooling speed signal if the second cooling conditioning signal is received and the outdoor air temperature value is less than the cooling temperature limit;
   (iv) operating the unit controller to transmit a first heating speed signal if the first heating conditioning signal is received;
   (v) operating the unit controller to transmit a second heating speed signal if the second heating conditioning signal is received and the outdoor air temperature value is less than or equal to the heating temperature limit; and
   (vi) operating the unit controller to transmit a third heating speed signal if the second heating conditioning signal is received and the outdoor air temperature value is greater than the heating temperature limit.

5. The method of claim 1, wherein the cooling temperature limit and the heating temperature limit are adjustable.

6. The method of claim 5, wherein the cooling temperature limit is approximately 85 degrees Fahrenheit.

7. The method of claim 5, wherein the heating temperature limit is approximately 40 degrees Fahrenheit.

8. The method of claim 4, wherein the first cooling speed signal is indicative of a compressor operational speed of approximately 4500 revolutions per minute, the second cooling speed signal is indicative of a compressor operational speed of approximately 2500 revolutions per minute, and the third cooling speed signal is indicative of a compressor operational speed of approximately 1100 revolutions per minute, the first heating speed signal is indicative of a compressor operational speed of approximately 5400 revolutions per minute, the second heating speed signal is indicative of a compressor operational speed of approximately 3600 revolutions per minute, and the third heating speed signal is indicative of a compressor operational speed of approximately 1800 revolutions per minute.

9. An HVAC system comprising:
- a two-stage system controller, the two-stage system controller configured to:
  - (a) determine a system demand; and
  - (b) transmit a conditioning signal corresponding to only two cooling capacities or only two heating capacities based in part on the system demand;
- an HVAC unit in electrical communication with the two-stage system controller, the HVAC unit comprising:
  - a compressor configured to operate at a plurality of speeds;
  - a temperature sensor configured to measure outdoor air temperature data; and
  - a unit controller in communication with the compressor and the temperature sensor, the unit controller configured to:
    - (a) receive the conditioning signal;
    - (b) determine whether outdoor air temperature data is greater than or equal to a cooling temperature limit or less than or equal to a heating temperature limit; and
    - (c) transmit a speed signal to the compressor based in part on the conditioning signal and the outdoor air temperature data.

10. The system of claim 9, wherein the two-stage system controller comprises a thermostat.

11. The system of claim 9, wherein the two-stage system controller is in at least one of a wireless or wired electrical communication with the HVAC unit.

12. The system of claim 9, wherein the two-stage system controller is further configured to transmit at least one of a first cooling conditioning signal, a second cooling conditioning signal, a first heating conditioning signal, or a second heating conditioning signal.

13. The system of claim 12, wherein the unit controller is configured to transmit at least three speed signals to the compressor based in part on the conditioning signal and the outdoor air temperature data.

14. The system of claim 13, wherein the unit controller is further configured to
- (i) receive the at least one of the first cooling conditioning signal, the second cooling conditioning signal, the first heating conditioning signal, or the second heating conditioning signal;
- (ii) transmit a first cooling speed signal if the first cooling conditioning signal is received;
- (iii) transmit a second cooling speed signal if the second cooling conditioning signal is received and the outdoor air temperature value is greater than or equal to the cooling temperature limit;
- (iv) transmit a third cooling speed signal if the second cooling conditioning signal is received and the outdoor air temperature value is less than the cooling temperature limit;
- (v) transmit a first heating speed signal if the first heating conditioning signal is received;
- (vi) transmit a second heating speed signal if the second heating conditioning signal is received and the outdoor air temperature value is less than or equal to the heating temperature limit; and
- (vii) transmit a third heating speed signal if the second heating signal conditioning is received and the outdoor air temperature value is greater than the heating temperature limit.

15. The system of claim 12, wherein the two-stage system controller is further configured to allow adjustment of the cooling temperature limit and the heating temperature limit.

16. The system of claim 9, wherein the cooling temperature limit is approximately 85 degrees Fahrenheit.

17. The system of claim 9, wherein the heating temperature limit is approximately 40 degrees Fahrenheit.

18. The system of claim 14, wherein the first cooling speed signal is indicative of a compressor operational speed of approximately 4500 revolutions per minute, the second cooling speed signal is indicative of a compressor operational speed of approximately 2500 revolutions per minute, and the third cooling speed signal is indicative of a compressor operational speed of approximately 1100 revolutions per minute, the first heating speed signal is indicative of a compressor operational speed of approximately 5400 revolutions per minute, the second heating speed signal is indicative of a compressor operational speed of approximately 3600 revolutions per minute, and the third heating speed signal is indicative of a compressor operational speed of approximately 1800 revolutions per minute.

* * * * *